United States Patent

[11] 3,586,428

| [72] | Inventor | Claude A. Matalou |
| | | 170, Rue de Grenelle, Paris, France |
| [21] | Appl. No. | 798,599 |
| [22] | Filed | Feb. 12, 1969 |
| [45] | Patented | June 22, 1971 |
| [32] | Priority | July 4, 1968 |
| [33] | | France |
| [31] | | 157,921 |

[54] FILMING SYSTEMS FOR MOTION PICTURES AND TELEVISION
4 Claims, 4 Drawing Figs.

[52] U.S. Cl. .................................................. 352/89,
178/7.85, 178/DIG 6, 352/47
[51] Int. Cl. .................................................. G03b 15/00,
G03b 15/12, G03b 21/28
[50] Field of Search .......................................... 178/6;
352/47, 89

[56] References Cited
UNITED STATES PATENTS
3,350,980  11/1967  Margolin .................... 352/89
FOREIGN PATENTS
887,978  1/1962  Great Britain .............. 352/47

Primary Examiner—Bernard Konick
Assistant Examiner—Howard W. Britton
Attorney—Stevens, Davis, Miller and Mosher ABSTRACT: Method of and apparatus for making motion-picture and television films with simultaneous projection of a background on a screen, by using an intermediate reflection on a semisilvered mirror, which consists in providing means for producing a rectilinear or circular lateral movement of the camera in combination with the pivotal movement of the camera in a horizontal plane in order to preserve the coincidence of the projections of said camera and of the projector on said semisilvered mirror.

INVENTOR
CLAUDE A. MATALOU
BY [signature]
ATTORNEYS

FILMING SYSTEMS FOR MOTION PICTURES AND TELEVISION

The present invention relates to improvements in methods of and apparatus for making motion-picture and television films with simultaneous projection of a background on a screen.

It is already well known, in the making of motion-picture or television films, to constitute a set by projecting a background on a screen, preferably of cylindrical configuration, disposed behind the actors or objects to be shot. According to a known system, the projector and the motion-picture camera are disposed on a same side of the screen, the latter being coated with elements capable of reflecting back the light rays substantially in their initial direction.

In practice, the projector and camera are so disposed that their optical axes merge substantially into each other, for example by using a half-silver coated plane mirror adapted to reflect light ray issuing from the projector at an angle of 90° the light rays reflected by the screen reaching the camera through the mirror without any distortion. It was also found that when it is desired to pivot the camera in a horizontal plane the vertical pivot axis should pass through the nodal point of the camera lens. Now, though the mirror may be close to the camera, the nodal point is more or less spaced from the mirror and therefore when the camera scans a certain angle the shot axis follows a certain horizontal path on the mirror plane; under these conditions, the camera and projector axes diverge from each other and the coincidence of these axes cannot be maintained.

The inconvenience derived therefrom is that the rays reflected by the screen do not penetrate properly into the camera lens, so that the light intensity of the projected image is no longer sufficient.

It is possible, according to this invention, to avoid the inconvenience set forth hereinabove by constantly maintaining the perfect and desired coincidence between the projections on the mirror of the output pupil of the projector lens and the input pupil of the camera.

To this end, the optical center of the camera lens (which can be merged with the input pupil) must describe a circular arc about the point of intersection of the mirror and of the camera lens optical axis when the camera lens is pivoted for scanning a certain field on said screen.

In practice, according to the projection distance and the selected projection and shot sizes, it is only necessary to move the camera laterally and parallel to the horizontal axis of said mirror, the value of the lateral movement of the camera depending on the angle of the camera pivoting movement.

This invention is also concerned with a camera permitting carrying out the method set forth hereinabove, wherein there are provided between the camera stand and the camera proper, in addition to the various means permitting the horizontal or vertical movements of the camera, as well as, if desired, its forward and backward movements, other means associated with the means permitting the said horizontal pivoting movements in order to produce a predetermined rectilinear or circular horizontal movement of the camera as a function of the pivoting angle thereof.

According to a preferred form of embodiment, the camera pivotally mounted on a first platform is rigid with a pinion carried by a vertical shaft which meshes with a rack secured to another platform on which said first platform is mounted and supported through the medium of sliding members. Thus, the first platform is caused to perform a horizontal movement of translation when the camera is pivoted horizontally.

The invention together with a typical form of embodiment thereof will now be described with reference to the attached drawing in which.

Figure 1:
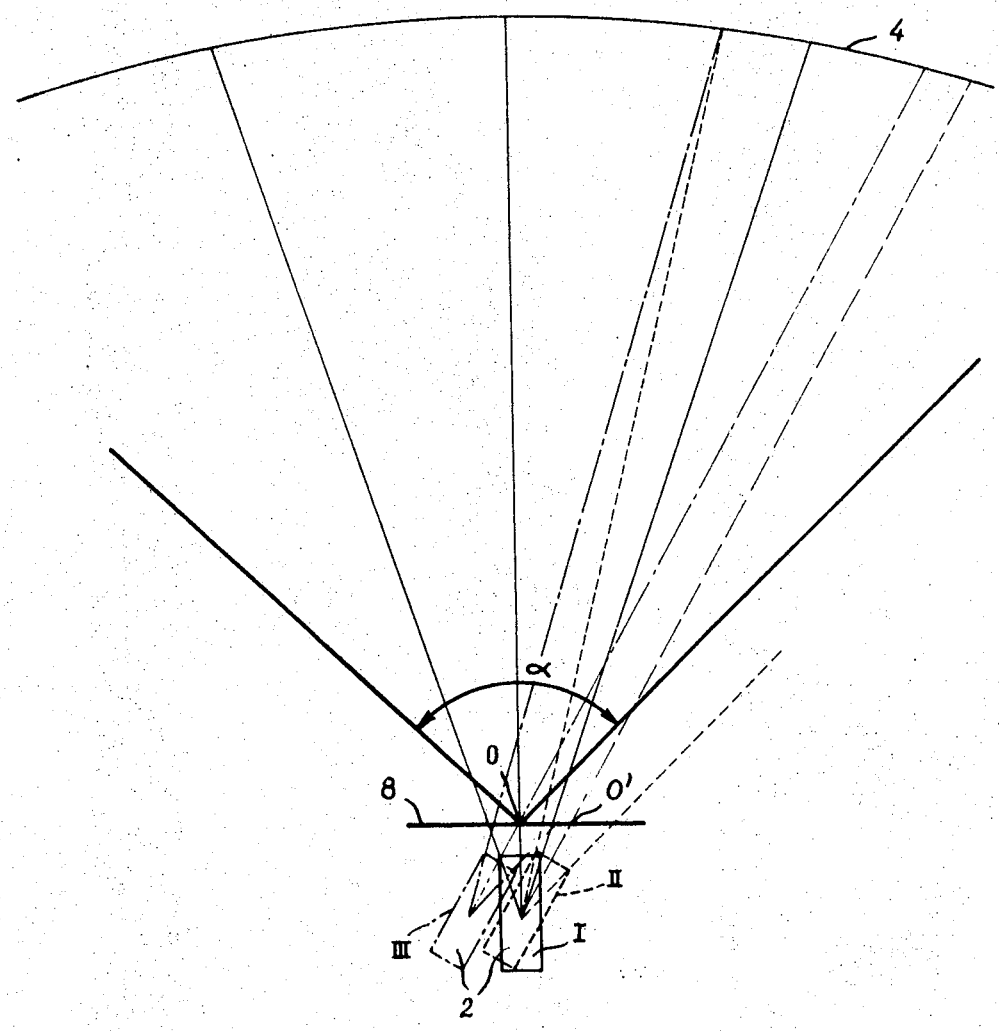
FIG. 1 is a diagram illustrating in plane view a filming arrangement according to the method of this invention.
Figure 2:
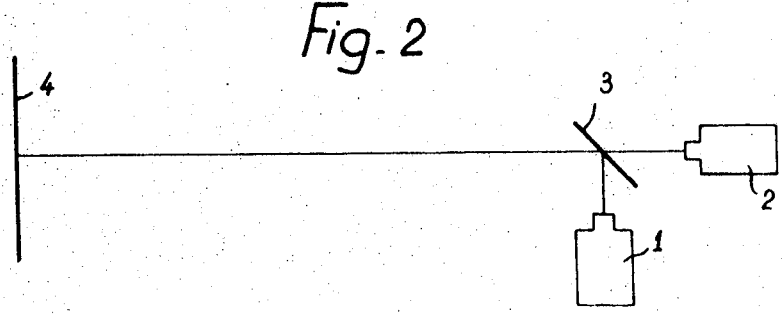
FIG. 2 is an elevational and diagrammatic sectional view taken along the vertical axial plane of the arrangement of FIG. 1.

Referring first to FIGS. 1 and 2 of the drawing, the filming arrangement illustrated diagrammatically therein comprises a projector 1, a camera 2, a plane semisilvered mirror 3 reflecting the light rays issuing from the projector on a screen 4 with a field angle $\alpha$ but permitting the distortionless passage of the light rays from the screen to the camera. As this arrangement is well known, for example through the French Pat. No. 974,491 it is not deemed necessary to describe the same in detail. However, since the projector is normally stationary, the camera must be capable of following the actors during their performance and therefore of pivoting horizontally and vertically, and also to move forwards and backwards, in case a zoom lens system is used, and it is known in this case to mount the camera on a stand permitting these various movements.

However, when the camera is pivoted horizontally for example from position I to position II (FIG. 1) the path of the optical axis on the mirror is transferred from 0 to $0^1$, whereby the axes of the projector and camera are no longer coincident, and the light rays reflected by the screen and passing through said point 0 penetrate only in a very small proportion into the camera lens.

However, if the camera is then moved parallel to itself to position III so that its optical axis again intersects said point 0 and the sides of its optical field or angle converge towards the intersectons formed between the sides of this angle and the screen, the lens will again properly receive the light rays from the screen. This arrangement will prevent the shadow of an actor disposed in front of the camera, which shadow is projected on the screen, from being recorded by the camera and thus reveal the presence of the screen.

Figure 3:
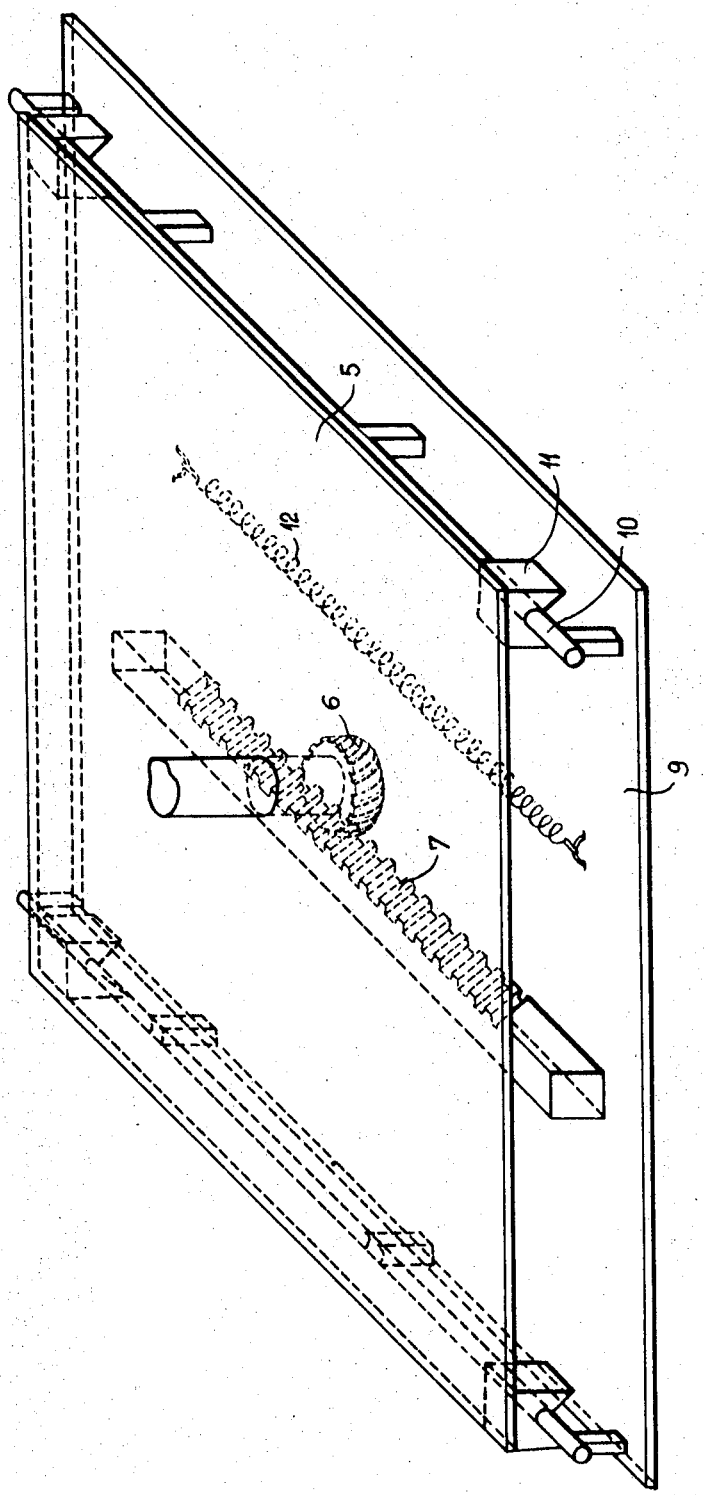
FIG. 3 is an isometric view showing the mounting provided in the camera platform for meeting the requirements of this invention.

This result may be obtained by using a specific form of embodiment of this invention, which is illustrated in FIG. 3 and consists in pivotally mounting the camera on a platform 5 and rigidly connecting the camera to a pinion 6 having a vertical axis. This pinion 6 meshes with a rectilinear rack 7 extending parallel to the horizontal path 8 of the mirror 3 (FIG. 1) on a fixed platform 9, longitudinal guide rods 10 rigid with said platform 9 receiving slides 11 solid with said platform 5 and causing the latter to move parallel to said rack when the camera and therefore pinion 6 are pivoted. By properly selecting the pitch of said rack 7 the optical axis of the camera can be caused to constantly intersect said point 0.

Besides, return springs such as 12 may be provided between the fixed and movable platforms for urging the camera to its normal position.

This arrangement is extremely satisfactory in certain cases; however, other cases may arise wherein it is required that the camera movement takes place along a circular arc strictly concentric to point 0, instead of along a straight line. A rack and guide rods having the desired curvature may be contemplated in this case so that the nodal point of the camera lens will remain at a strictly constant distance from said point 0.

Figure 4:
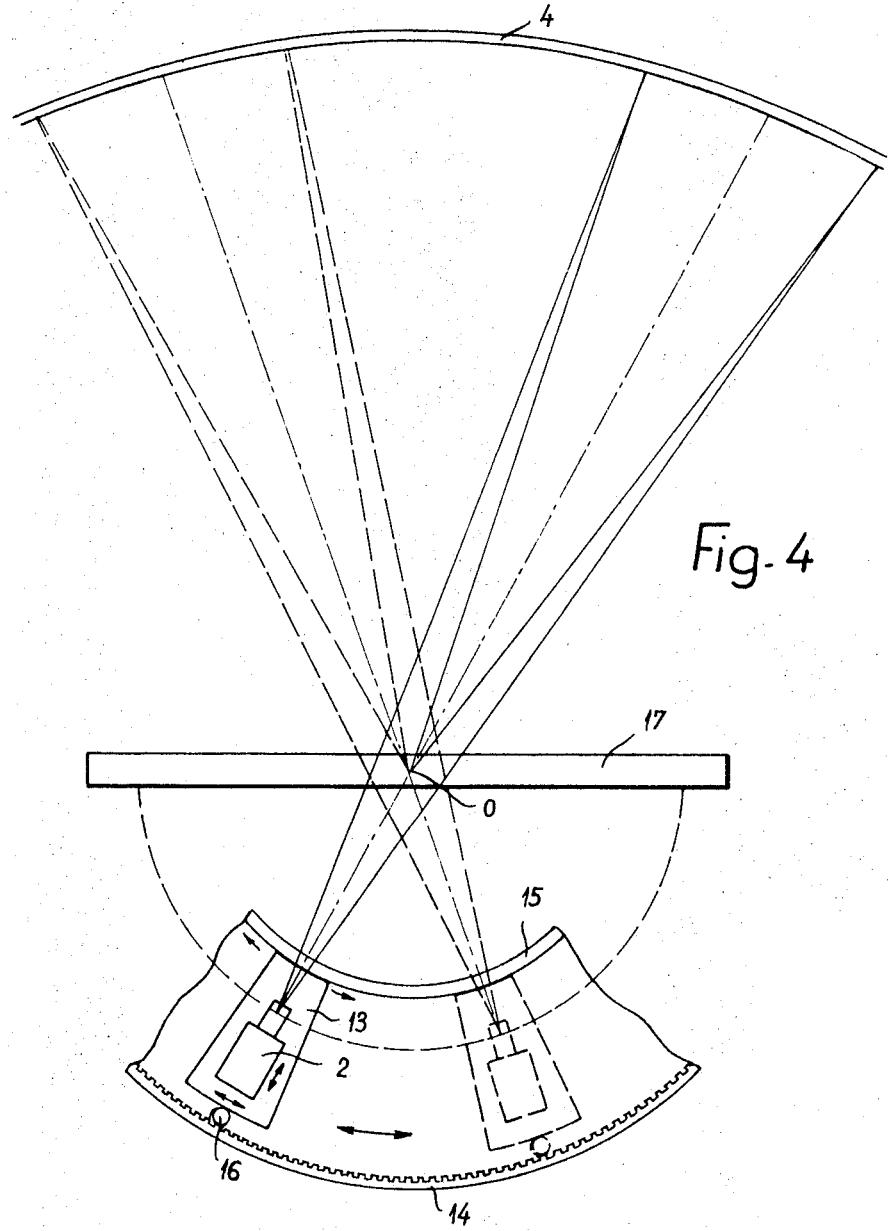
FIG. 4 is another diagram showing in plan view a modified form of embodiment of filming arrangement.

An arrangement of this character is illustrated in FIG. 4; in this example, the camera 2 is mounted on a carriage 13 on which it can perform an axial movement and a transverse movement. The carriage 13 is movably mounted between a circular rack 14 and a concentric guide rod 15 by means of a pinion 16 formed with skew teeth.

The center of the circular rack lies at said point 0 which is the point of intersection between the projection axis and the mirror 17. In this arrangement the camera 2 can scan the entire screen surface while remaining constantly aligned with the above-defined point 0.

Other similar arrangements may be devised by those skilled in the art without inasmuch departing from the spirit and scope of the invention as set forth in the appended claims.

I claim:

1. An apparatus for making motion-picture and television film comprising a camera, a projector, a semireflective mirror, a screen on which said projector projects a background image, said camera and said projector being disposed on the same side of the screen and symmetrically on each side of said semireflective mirror in such a manner that light rays issuing from the projector are reflected at an angle of 90° onto said screen, means stationarily mounting said projector, means supporting said camera to be movable at least in a horizontal plane and comprising first means allowing a pivotal movement of said camera around a vertical axis, and second means allowing a lateral movement of said camera, means connecting said first and second means so that a pivotal movement of said camera causes a determined lateral movement whereby the camera axis and projector axis constantly intersect on the same point of the mirror.

2. An apparatus as claimed in claim 1, wherein said lateral movement is rectilinear.

3. An apparatus as claimed in claim 1, wherein said lateral movement is circular.

4. An apparatus as claimed in claim 1, wherein said camera support means comprises a first platform, a pinion having a vertical axis and passing through said first platform with said camera mounted thereon, a second platform, a rack carried by said second platform and meshing with said pinion, and slide members having guide means mounted between said platforms allowing movement therebetween.